3,324,131
ANTHRAPYRIDONE DYESTUFFS
Guido R. Genta, Dunnstown, Pa., assignor to American Aniline Products, Inc., a corporation of Delaware
No Drawing. Filed Sept. 20, 1966, Ser. No. 580,590
4 Claims. (Cl. 260—278)

This invention relates to anthrapyridone dyestuffs. In one specific aspect it relates to new anthrapyridones substituted with aminoalkanol groups in the 4-position. The new dyes are pink in color and are remarkably useful for coloring rigid and non-rigid plastics.

Alkylanthrapyridones, such as methylanthrapyridone, have been known for many years. In U.S. Patent 994,803 Oskar Unger and Paul Thomaschewski reported the manufacture of red wool dyestuffs obtained by treating arylaminoanthrapyridones with sulfonating agents. More recently, in U.S. Patent 2,756,234, a class of aminoalkylaminoanthrapyridones was reported to have useful chemotherapeutic properties. As a class, the organoaminoanthrapyridones have not been recognized as good dyes for plastics.

I have discovered a new class for anthrapyridone dyes which have, when applied to rigid and non-rigid plastics, outstanding light fastness and heat stability. My new compounds are further characterized by a strong yellowish-red fluorescence, which makes them unique as plastic colorants in certain commercial operations. The solubility of my new dyes in plastics assists in providing uniform coloration and the desired depth of shade.

It is therefore an object of the present invention to provide a new class of red to pink colors for rigid and non-rigid plastics.

In accordance with the invention, I have discovered new dyes of the formula:

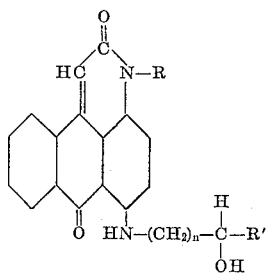

wherein R is a member selected from the group consisting of methyl and ethyl; R' is a member selected from the group consisting of hydrogen and methyl; and $n$ is an integer having a value of from 1–5.

The dyes of the invention are made by reacting a 4-halo-1:9(N)-alkylanthrapyridone with the appropriate aminoalkanol, preferably in the presence of a copper salt, such as cuprous chloride. The product is recovered from the reaction mixture by standard methods.

The anthrapyridone intermediates useful in making the dyes of the invention; e.g., 4-bromo-1:9(N)-methylanthrapyridone, and 4-bromo-1:9(N)-ethylanthrapyridone, are commercially available. If desired, these intermediates can be easily made by acetylation of 1-methylamino-4-bromoanthraquinone or 1-ethylamino-4-bromoanthraquinone with acetic anhydride in the presence of a trace of sulfuric acid as a catalyst. The resulting acetylalkylamino-4-bromoanthraquinone is ring-closed to form the desired intermediate by boiling with dilute caustic soda.

Aminoalkanols useful as intermediates for the dyes of the invention include 2-aminoethanol, 1-amino-2-propanol, 3-amino-1-propanol, and the like.

The dyes of the invention are made by reacting one mole of the anthrapyridone intermediate with one mole of the desired aminolkanol. The aminolkanol can be used in substantial excess to serve as a solvent for the reaction, or alternatively, a polar organic solvent can be used. Particularly useful polar organic solvents are those having a boiling point of at least 120° C. These solvents include ethylene glycol monoethyl ether, ethylene glycol monoethyl ether, n-amyl alcohol, Cellosolve acetate, diacetone alcohol, ethylene glycol, benzyl alcohol, diethylene glycol, butyl Cellosolve, sulfolane, dimethylformamide, dimethylacetamide, and the like.

The reaction takes place at a temperature between 60° C. and the boiling point of the reaction mixture. At temperatures below about 60° C. the reaction does not proceed at a commercially useful rate. The preferred reaction temperature is between about 100 and 150° C.

If desired, the reaction can be carried out in the presence of a catalyst. Particularly useful catalysts are copper salts, such as copper acetate, cuprous chloride, copper sulfate, and the like.

The reaction generally takes from 2–12 hours. After the reaction is complete, the mixture is allowed to cool to ambient temperatures. The product is separated by filtration and, if desired, washed with alcohol, water, or both.

The dyes of the invention are characterized by good solubility in plastics and excellent light fastness. The colors thereof range from bright to red to pink.

The dyes are useful in the coloration of plastics derived from vinyl monomers, particularly poly-alpha-olefins; e.g., polyethylene; polyacrylates; e.g., polymethylmethacrylate and polyacrylonitrile; and polymers of vinylaryl monomers; e.g., polystyrene; copolymers of styrene and butadiene, styrene and alpha-methylstyrene, and the like. The dyes can be easily applied by dissolving from 0.5 to 5 percent by weight of the dye in the monomer prior to polymerization, or alternatively, by dissolving the dye in the molten plastic.

My invention is further illustrated by the following examples:

*Example I*

To a 500 ml. flask equipped with heater, stirrer, thermometer, and reflux condenser there were charged 300 g. 2-aminoethanol, 34 g. 4-bromo-1:9-(N)-methylanthrapyridone and 3.0 g. cuprous chloride catalyst. The mixture was heated slowly to 115–120° C. and was held at this temperature for a period of two hours. The reaction mass was diluted with 200 g. ethylene glycol monoethyl ether and was thereafter cooled to 30° C. The red crystals thus formed were separated by filtration, washed with water, and dried. Twenty-six g. of the desired product, 4-ethanolamino-1:9(N)-methylanthrapyridone, was obtained. The product was ground to a fine powder. Elemental analysis showed: N: 8.3% (theory, 8.7%); C: 72.8% (theory, 71%); and H: 4.6% (theory, 5%).

A 200 mg. quantity of the dye and 200 g. methyl methacrylate molding powder were run over a Thropp mill for 10–15 minutes at a temperature of 145–160° C. to incorporate the color. The colored plastic was taken off of the mill and pressed into a bright pink disk of uniform coloration. The dye exhibited excellent light fastness and heat stability when tested by standard laboratory methods. The dyed plastic had a bright appearance and exhibited a yellowish-orange fluorescence.

*Example II*

To the 500 ml. flask equipped as described in Example I there were charged 200 cc. 3-amino-1-propanol, 34 g. 4-bromo-1:9(N)-methyl-anthrapyridone and 4 g. cuprous chloride. The mass was heated to 110–115° C. and maintained at this temperature for a period of one hour. It was then cooled to 100° C. and diluted with 100 cc. of ethylene glycol monoethyl ether. After cooling to 40–45° C., the mixture was filtered and washed successively with 50 percent alcohol, water, weak soda ash solution, and 50 percent alcohol. The product was dried and ground to a fine powder.

The product dyed plastic material in somewhat bluer shades than the product obtained in Example I.

*Example III*

To a 1000 cc. tubular flask there was charged 300 cc. 1 - amino - 2-propanol, 34 g. 4-bromo-1:9(N)methylanthrapyridone and 4 g. cuprous chloride. The mass was heated to 110–115° C. and maintained at this temperature for a period of three hours. It was then cooled and diluted with 200 cc. ethylene glycol monoethyl ether. The reaction mixture was then cooled to room temperature and agitated overnight. It was then filtered and washed successively with 50 percent alcohol, water, weak soda ash solution, and 50 percent alcohol. The product was dried and ground to a fine powder.

There was thus obtained 29 g. of reddish-pink dye which dyed plastic material in somewhat brighter bluer shades than the product obtained in Example I. By accelerated laboratory testing methods the light fastness measured 80 hours.

I claim:
1. The dye of the formula:

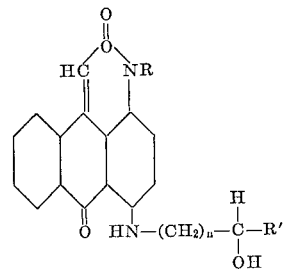

wherein R is a member selected from the group consisting of methyl and ethyl; R' is a member selected from the group consisting of hydrogen and methyl; and $n$ is an integer having a value of 1–5.

2. The dye of claim 1 wherein R is methyl, R' is hydrogen, and $n$ is one.

3. The dye of claim 1 wherein R is methyl, R' is methyl, and $n$ is one.

4. The dye of claim 1 wherein R is methyl, R' is hydrogen, and $n$ is two.

References Cited

UNITED STATES PATENTS 2,035,921   12/1935   Weinand _____ 260—278

ALEX MAZEL, *Primary Examiner.*

DONALD G. DAUS, *Assistant Examiner.*